US012363585B2

(12) United States Patent
Cosentino et al.

(10) Patent No.: US 12,363,585 B2
(45) Date of Patent: Jul. 15, 2025

(54) MANAGING MESSAGE SIZES IN A MESH NETWORK (71) Applicant: RED HAT, INC., Raleigh, NC (US)

(72) Inventors: Andrea Cosentino, Rome (IT); Leigh Griffin, Waterford (IE); Paolo Antinori, Novara (IT)

(73) Assignee: Red Hat, Inc., Raleigh, NC (US)

( * ) Notice: Subject to any disclaimer, the term of this patent is extended or adjusted under 35 U.S.C. 154(b) by 477 days.

(21) Appl. No.: 17/716,198

(22) Filed: Apr. 8, 2022

(65) Prior Publication Data
US 2023/0328586 A1 Oct. 12, 2023

(51) Int. Cl.
H04W 28/06 (2009.01)
H04W 24/02 (2009.01)
H04W 28/02 (2009.01)
H04W 40/04 (2009.01)
H04W 84/18 (2009.01)

(52) U.S. Cl.
CPC ........... *H04W 28/06* (2013.01); *H04W 24/02* (2013.01); *H04W 28/0252* (2013.01); *H04W 40/04* (2013.01); *H04W 84/18* (2013.01)

(58) Field of Classification Search
None
See application file for complete search history.

(56) References Cited

U.S. PATENT DOCUMENTS

| 9,110,745 | B2 | 8/2015 | Kang et al. | |
| 10,833,921 | B2 * | 11/2020 | Higuchi | H04L 41/0695 |
| 11,019,151 | B2 | 5/2021 | Nolan et al. | |
| 2002/0142780 | A1 * | 10/2002 | Airy | H04L 5/14 455/452.2 |
| 2003/0012176 | A1 * | 1/2003 | Kondylis | H04W 28/26 370/348 |
| 2004/0218550 | A1 * | 11/2004 | Kim | H04W 48/16 370/254 |
| 2005/0152280 | A1 * | 7/2005 | Pollin | H04L 41/00 370/252 |
| 2011/0151884 | A1 * | 6/2011 | Zhao | H04L 51/58 455/566 |

(Continued)

FOREIGN PATENT DOCUMENTS

CN 113141590 A 7/2021

OTHER PUBLICATIONS

Agyemang, J.O., et al., "A Lightweight Messaging Protocol for Internet of Things Devices," Technologies, 2022, https://www.mdpi.com/2227-7080/10/1/21/pdf.

(Continued)

*Primary Examiner* — Hassan A Phillips
*Assistant Examiner* — Gautam Sharma
(74) *Attorney, Agent, or Firm* — Kilpatrick Townsend & Stockton LLP (57) ABSTRACT In one example described herein, a processing device can receive computing metrics from nodes within a mesh network. The processing device can use those computing metrics to derive a maximum message size based on the capabilities of the nodes within the mesh network. The processing device can then transmit the maximum message size to nodes within the mesh network so that the nodes can generate messages that do not exceed the maximum message size.

20 Claims, 4 Drawing Sheets

(56) References Cited

U.S. PATENT DOCUMENTS

| | | | | |
|---|---|---|---|---|
| 2012/0036196 | A1* | 2/2012 | Patel | G06Q 10/107 |
| | | | | 709/206 |
| 2013/0013731 | A1* | 1/2013 | Ree | H04L 67/125 |
| | | | | 709/217 |
| 2013/0023281 | A1* | 1/2013 | Meredith | H04W 36/008375 |
| | | | | 455/456.1 |
| 2015/0071061 | A1* | 3/2015 | Sahu | H04L 47/19 |
| | | | | 370/230 |
| 2015/0249627 | A1* | 9/2015 | Jimenez | H04L 51/066 |
| | | | | 709/206 |
| 2015/0341874 | A1* | 11/2015 | Nguyen-Dang | H04W 52/0219 |
| | | | | 370/350 |
| 2017/0265227 | A1* | 9/2017 | Wang | H04W 76/11 |
| 2019/0124156 | A1* | 4/2019 | Nolan | H04L 43/08 |
| 2019/0235932 | A1* | 8/2019 | Tuffs | G06F 1/266 |
| 2023/0328586 | A1* | 10/2023 | Cosentino | H04W 28/06 |
| | | | | 370/212 |

OTHER PUBLICATIONS

Debroy, S., et al., "SpEED-IoT: Spectrum aware energy efficient routing for device-to-device IoT communication," Elsevier B.V., 2017, https://www.sciencedirect.com/science/article/abs/pii/S0167739X17307148.

Elappila, M., et al., "Dynamic Survivable Path Routing for Fast Changing IoT Netwok Topologies," IEEE, 2018, https://ieeexplore.ieee.org/document/8455892.

Jocksch, A., et al., "An optimisation of all reduce communication in message-passing systems," Elsevier B.V., 2021, https://www.sciencedirect.com/science/article/pii/S0167819121000612.

Pustisek, M., et al., "LDAF: Low-Bandwidth Distributed Applications Framework in a Use Case of Blockchain-Enabled IoT Devices," Sensors, 2019, https://www.ncbi.nlm.nih.gov/pmc/articles/PMC6567101/.

* cited by examiner

MANAGING MESSAGE SIZES IN A MESH NETWORK

TECHNICAL FIELD

The present disclosure relates generally to computer mesh networks. More specifically, but not by way of limitation, this disclosure relates to controlling the sizes of messages in a computer mesh network.

BACKGROUND

A mesh network can refer to a network of nodes in communication with each other. In a mesh network, the nodes may connect directly, dynamically, and non-hierarchically to the other nodes and cooperate with one another to efficiently route data to and from clients. The nodes can communicate with one another via wired and wireless mediums, for example by using WiFi (IEEE 802.11x), radio signals, infrared signals, and acoustic signals.

The mesh network can contain nodes that vary in function, sensory capability, processing power, or software. For instance, a laptop computer, a smartphone, smartwatch, a thermostat, and a smart light bulb could all be nodes of the same wireless mesh network. The wireless mesh network may be an ad-hoc network, where there is no central infrastructure, such as a router or a wireless access point, to mediate communication between nodes.

DETAILED DESCRIPTION

A mesh network can route messages through multiple cooperating nodes. Mesh networks may be employed in situations where nodes of low computational power or low memory capacity serve vital functional roles, such as traffic lights or insulin pumps. Guaranteeing reception of messages sent from comparatively more computationally powerful devices within a mesh to comparatively less computationally powerful devices can be problematic. In some instances, messages can be too large for the less powerful devices, effectively overwhelming the capacity of a less powerful device, preventing the reception of the message and reception of subsequent messages.

Some examples of the present disclosure can overcome one or more over the abovementioned problems by determining a maximum message size based on the capabilities of nodes within a mesh network and controlling the nodes to comply with the maximum message size. This can help to relieve overwhelmed, less computationally powerful nodes. In one example, an administrative node can gather computing metrics from every node within the boundary of a mesh network. Examples of the computing metrics can include processor usage, memory usage, storage usage, etc. The administrative node can use the computing metrics to determine the maximum message size that each node within the mesh is capable of handling. From the numerous maximum message sizes computed for the nodes, the administrative node can determine which of the maximum message sizes has the smallest value. The maximum message size with the smallest value will generally correspond to the least computationally powerful node. The administrative node can then select that maximum message size (the one with the smallest value) to be the maximum message size for all messages sent within the mesh network. That maximum message size can then be transmitted every node within the mesh, so that the nodes can comply with the maximum message size. Compliance with the maximum message size means that the nodes do not send messages that are larger than the maximum message size. In this way, the message sizes transmitted within the network can be controlled to help guarantee reception by the least computationally powerful node. Of course, all of the remaining nodes that are more powerful than the least computationally powerful node will also be able to receive messages that comply with the selected maximum message size.

Figure 1:
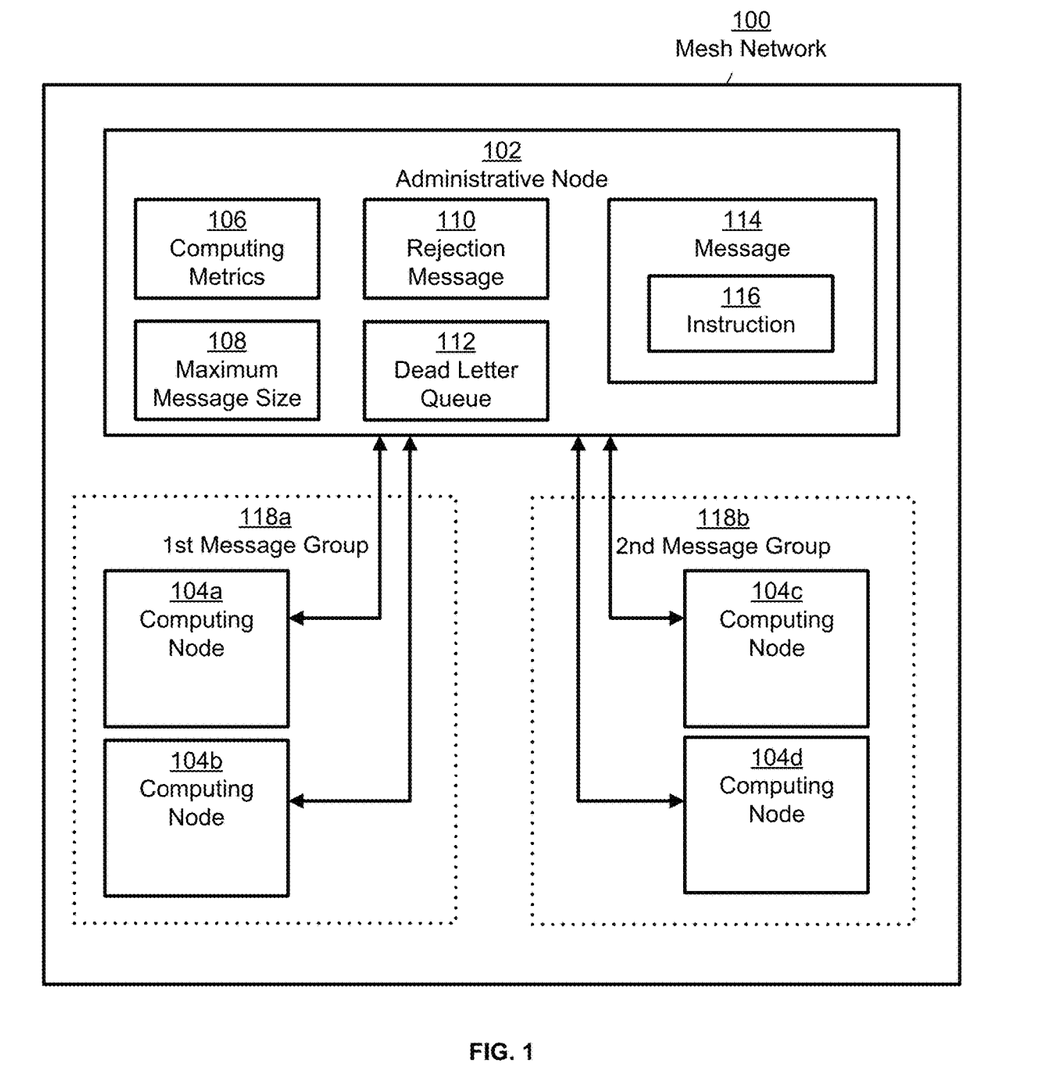
FIG. 1 is a block diagram of an example of a mesh network with a maximum message size according to some aspects of the present disclosure.

FIG. 1 is a block diagram of an example of a mesh network 100 with a maximum message size according to some aspects of the present disclosure. The mesh network 100 contains an administrative node 102 and several computing nodes 104*a-d*. Examples of the administrative node 102 may include a desktop computer, laptop computer, or server. Examples of the computing nodes 104*a-d* may include sensors, edge devices, or other Internet of Things (IoT) devices.

The administrative node 102 may receive computing metrics 106 from the computing nodes 104*a-d* within the mesh network 100. In some examples, the administrative node 102 may receive computing metrics 106 periodically as they are broadcasted at repeating intervals by the computing nodes 104*a-d*. Additionally or alternatively, the administrative node 102 may poll the computing nodes 104*a-d* for the computing metrics 106. In some cases, the administrative node 102 may receive the computing metrics 106 from computing nodes 104*a-d* or other computing nodes as they enter or leave the boundary of the mesh network 100. Receiving computing metrics 106 at periodic intervals or when the mesh topology changes may help guarantee the administrative node 102 ultimately chooses a maximum message size 108 that is appropriate for the current population of nodes within the mesh network 100.

The computing metrics 106 for the computing nodes 104*a-d* may include their processing power, total system memory, available memory, bandwidth, buffer limitations, and other parameters. The computing metrics 106 may also include communication mechanisms used by the computing node 104*a-d*, such as infrared, wireless fidelity (Wi-Fi), or Bluetooth. In some examples, computing metrics may include message handling capabilities of the computing node 104*a-d*, such as Extensible Markup Language (XML) or HyerText Markup Language (HTML).

From the computing metrics 106, the administrative node 102 may determine numerous message sizes representing what size message each computing node 104*a-d* can reliably handle (e.g., receive, buffer, and process). In some examples, the administrative node may enter the computing metrics 106 of the computing node 104*a* into a function that solves for a largest message size that can be transferred to computing node 104*a* in a set amount of time. The function may be bound by the internal limitations of computing node 104a, such as processing power or available memory. The administrative node may enter the computing metrics 106 of the computing node 104a into multiple functions, also solving for a largest message size that can be transferred to a computing node 104a to computing node 104c in a set amount of time. The multiple functions may account for various means of transmission, message handling capabilities, or other variables that relate to communication of messages between computing nodes 104a-d within the mesh 100 (e.g., as opposed to the internal limitations of the computing nodes 104a-d).

Once the maximum message size for each node is computed, the administrative node 102 may compare the maximum message sizes against each other to determine which of them is the smallest, which can be referred to as a limiting message size. The administrative node 102 may select that limiting message size as a maximum message size 108 for the mesh network 100.

The administrative node 102 may transmit the selected maximum message size 108 (i.e., the limiting message size) to the computing nodes 104a-d. The computing nodes 104a-d may receive the maximum message size 108 and, in response, attenuate the messages they transmit to be no larger than the maximum message size 108. In this way, the mesh network 100 can be configured to comply with the maximum message size 108.

Thereafter, a node within the mesh network 100 (e.g., the administrative node 102 or one of the computing nodes 104b-d) may receive a message 114 that is intended for a computing node 104a. The message 114 may be received from a transmitting node that can be another computing node 104a-d within the mesh network 100 or a client device outside the mesh network 100. In some examples, the message may include instructions 116 for the computing node 104a. Example instructions 116 may include actuating a device in communication with the computing node 104a or a keep-alive message to maintain a link between nodes.

In response to receiving the message 114, the node may determine whether the message 114 exceeds the maximum message size 108. In FIG. 1 the maximum message size 108 is located in the administrative node 102, but in some examples the maximum message size 108 is also present in the memory of at least some of the computing nodes 104a-d for purposes of making this determination. In response to determining the message 114 conforms to the maximum message size 108, the node forward the message 114 to the target (e.g., addressed) computing node 104a. Otherwise, the node can reject the message 114. This may involve the node preventing the message 114 from being forwarded to the target computing node 104a. The node may also issue a rejection message 110 to the transmitting node indicating that the message 114 is too large. In some examples, the node may further transmit the oversized message 114 to a dead letter queue 112. Although in FIG. 1 the dead letter queue 112 is located in the administrative node 102, in other examples the dead letter queue 112 may be located elsewhere in the mesh network 100, such as on one of the computing nodes 104a-d.

In some examples, the mesh network 100 may categorize the computing nodes 104a-d into different message groups 118a-b capable of handling messages of different sizes. For example, the administrative node 102 may assign computing nodes 104a-b to a first message group 118a and computing nodes 104c-d to a second message group 118b. The first message group 118a and second message group 118b may be determined by the administrative node 102 based on the numerous message sizes derived from the computing metrics 106. The first message size may only be able to handle messages less than or equal to the maximum message size 108. The second message group 118b may be able to handle messages greater than the maximum message size 108. Messages may be routed through the mesh network 100 to the appropriate message group 118a-b based on the messages' sizes.

An example application of the first message group 118a and the second message group 118b can involve the mesh network 100 within a house. The mesh network 100 of the house may include a thermostat as the computing node 104a, an outdoor thermometer as the computing node 104b, a laptop computer as the administrative node 102, a smartphone as the computing node 104c, and a smart television as the computing node 104d. In such an example, the laptop computer may assign the thermostat and the outdoor thermometer to the first message group 118a. The laptop computer may also assign the smartphone and the smart television to the second message group 118b. The thermostat and the outdoor thermometer may be less powerful computing devices than the smartphone and the smart television, so the thermostat and the outdoor thermometer may become congested or otherwise fail if inundated with large messages. So, the first message group 118a can be limited to messages that are no larger than the maximum message size 108, while the second message group 118b may not have such a limitation.

In the above example, the outdoor thermometer as 104b may inform the thermostat of the outside temperature by delivering a message (e.g., message 114) conforming to the maximum message size 108. The smartphone may be carried from room to room to also inform the thermostat of a presence of a person carrying the smartphone. The smartphone may communicate to the thermostat by also delivering a message conforming to the maximum message size 108. The smartphone may also transfer a message exceeding the maximum message size 108 to the smart television. An example message exceeding the maximum message size 108 may be a video file. The smart television may send a message conforming to the maximum message size 108 to the thermostat in response to the video file being played, to indicate to the thermostat that a person is likely in the room with the smart television.

Although FIG. 1 shows a certain number and arrangement of components, this is intended to be illustrative and non-limiting. Other examples may involve more components, fewer components, different components, or a different arrangement of the components than is shown in FIG. 1. For instance, another example may involve hundreds or thousands of computing nodes split among dozens of message groups. Additionally or alternatively, the administrative node 102 may be one of the computing nodes 104a-d (e.g., rather than separate from them).

Figure 2:
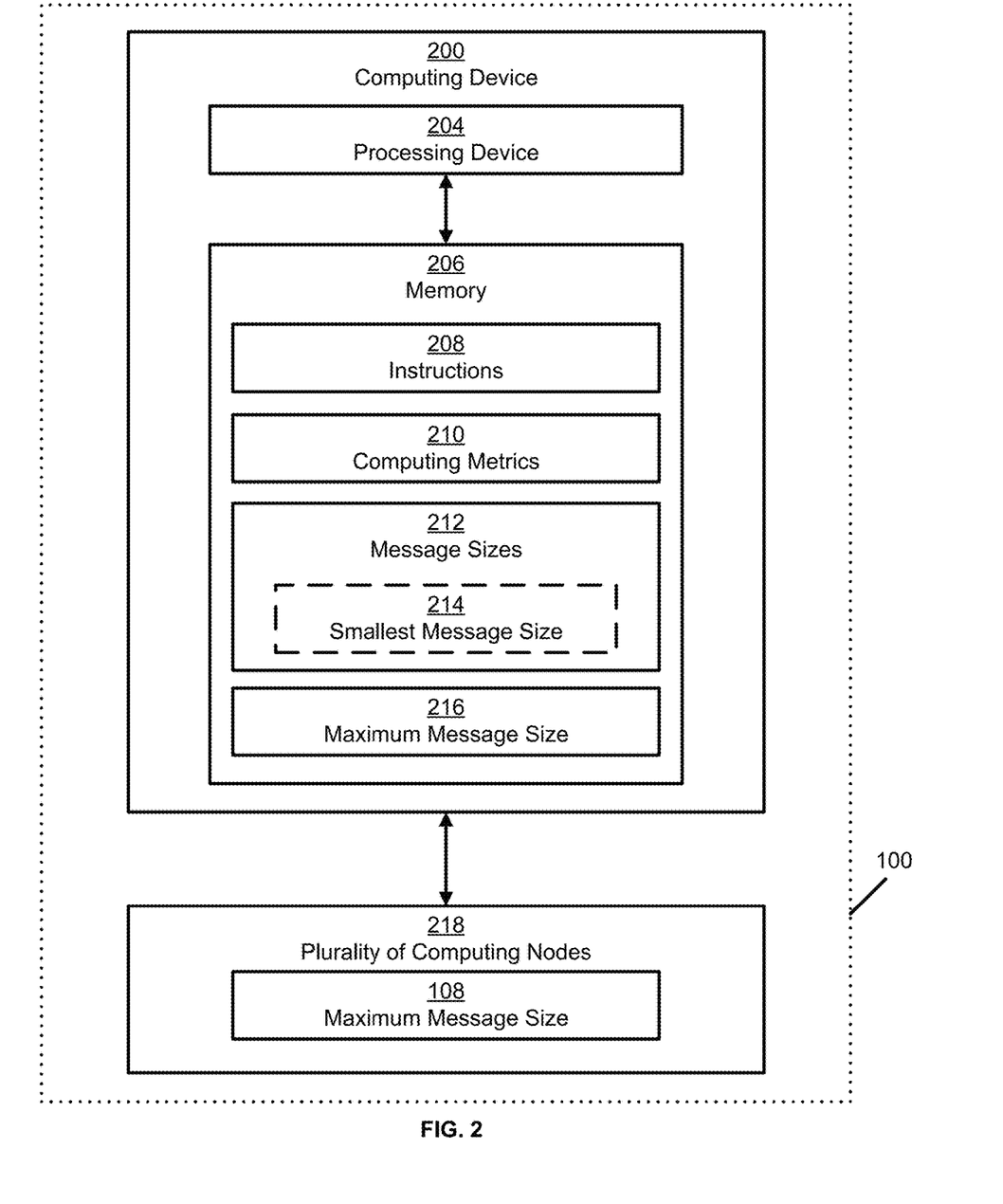
FIG. 2 is a block diagram of an example of a computing device containing instructions for implementing some aspects of the present disclosure.

FIG. 2 is a block diagram of an example of a computing device 200 containing instructions 208 for implementing some aspects of the present disclosure. The computing device 200 may correspond to the administrative node 102 of FIG. 1, in some examples. The computing device 200 can be in communication with a plurality of computing nodes 218 within a mesh network 100. The computing device 200 and the computing nodes 218 can store a maximum message size 108 (e.g., in memory), which is usable to limit the sizes of messages transmitted to and from those nodes 218.

The computing device 200 includes a processing device 204 that may be communicatively coupled to a memory 206. In some examples, the processing device 204 and the memory 206 can be part of the same computing device. In other examples, the processing device 204 and the memory 206 can be distributed from (e.g., remote to) one another.

The processing device 204 can include one processor or multiple processing devices. Non-limiting examples of the processing device 204 include a Field-Programmable Gate Array (FPGA), an application-specific integrated circuit (ASIC), a microprocessor, etc. The processing device 204 can execute instructions 208 stored in the memory 206 to perform operations. In some examples, the instructions 208 can include processor-specific instructions generated by a compiler or an interpreter from code written in a suitable computer-programming language, such as C, C++, C #, etc.

The memory 206 can include one memory or multiple memories. The memory 206 can be non-volatile and may include any type of memory that retains stored information when powered off. Non-limiting examples of the memory 206 include electrically erasable and programmable read-only memory (EEPROM), flash memory, or any other type of non-volatile memory. At least some of the memory 206 can include a non-transitory computer-readable medium from which the processing device 204 can read instructions 208. A computer-readable medium can include electronic, optical, magnetic, or other storage devices capable of providing the processing device 204 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 208.

In some examples, the processing device 204 can execute the instructions 208 to perform some or all of the functionality described herein. For example, the processing device 204 can receive and store computing metrics 210 from the plurality of computing nodes 218. Examples of the computing metrics 210 can include processing power, total memory, available memory, bandwidth, buffer limitations, communication mechanisms such as infrared, Wi-FI, or bluetooth, message handling capabilities such as XML or HTML, or other parameters related to the plurality of computing nodes 218 within the mesh network 100. The processing device 204 can then compute numerous message sizes 212 based on the computing metrics 210. The message sizes 212 can represent the largest message size that each computing node 218 can handle at a given point in time. The largest message size that a particular computing node 218 can handle may dynamically change over time as computing resources are consumed by that node.

The processing device 204 can then select a smallest message size 214 from the numerous message sizes 212. The processing device 204 can select the smallest message size 214 as a maximum message size 108 to be used for at least a portion of the mesh network 100. The processing device 204 can transmit the maximum message size 108 to the plurality of computing nodes 218. In response to receiving the maximum message size 108, the plurality of computing nodes 218 can configure themselves to comply with the maximum message size 108. This may involve the plurality of computing nodes 218 storing the maximum message size 108 in memory 206, setting a flag, and/or making some other configuration change (e.g., to force the computing nodes 218 to comply with the maximum message size 108).

Figure 3:
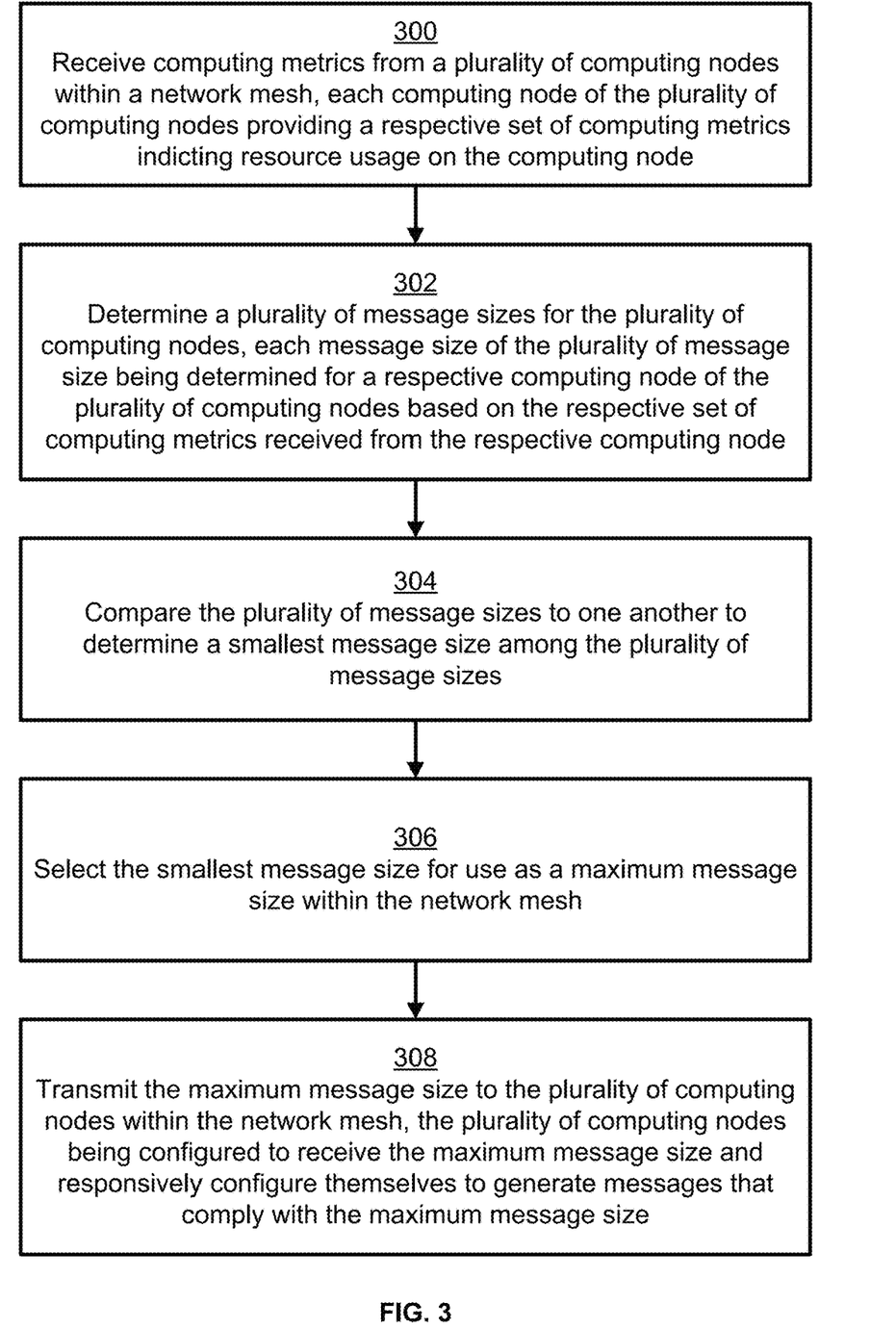
FIG. 3 is a flow chart of an example of a process for implementing a maximum message size within a mesh network according to some aspects of the present disclosure.

FIG. 3 is a flow chart of an example of a process for implementing a maximum message size within a mesh network according to some aspects of the present disclosure. In some examples, the processing device 204 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1-2.

In block 300, the processing device 204 receives computing metrics 210 from the plurality of nodes 218 within a mesh network 100. Each computing node 104*a-d* of the plurality of computing nodes 218 may provide a respective set of computing metrics 210 indicating resource usage on a computing node 104*a-d*. Resource usage metrics may include processor usage, available memory, bandwidth usage, buffer limitations, communication mechanisms such as infrared, Wi-FI, or bluetooth, message handling capabilities such as XML or HTML, or other parameters. Each computing node 104*a-d* may also provide other metrics, such as total memory, total processing power, or total bandwidth.

In block 302, the processing device 204 may determine numerous message sizes 212 from the plurality of computing nodes 218. Each message size within the numerous message sizes 212 may be determined for a respective computing node 104*a-d* from within the plurality of computing nodes 218. Each message size may be determined based on the computing metrics 210 received from the respective computing node 104*a-d*.

In block 304, the processing device 204 may compare the numerous message sizes 212 to one another to determine a smallest message size 214.

In block 306, the processing device 204 may select the smallest message size 214 from amongst the numerous message sizes 212 to be the maximum message size 108 within the mesh network 100 (e.g., within the entire mesh network 100 or within a particular message group of the mesh network 100). The processing device 204 may select the smallest message size 214 to better guarantee that nodes within the mesh network 100 can handle the messages.

In block 308, the processing device 204 can transmit the maximum message size 214 to the plurality of computing nodes 218 within the mesh network 100. This may involve interfacing with a transceiver, network card, or other hardware component to facilitate the transmission. The computing nodes 218 may be able to receive the maximum message size 214 and, in response, configure themselves to generate messages that comply with the maximum message size 214.

It will be appreciated that the above process may repeated periodically or in response to certain events, such as changes to the mesh topology. Thus, the smallest message size 214 selected in block 306 may change over time as the mesh topology changes or the nodes' computing metrics change.

Figure 4:
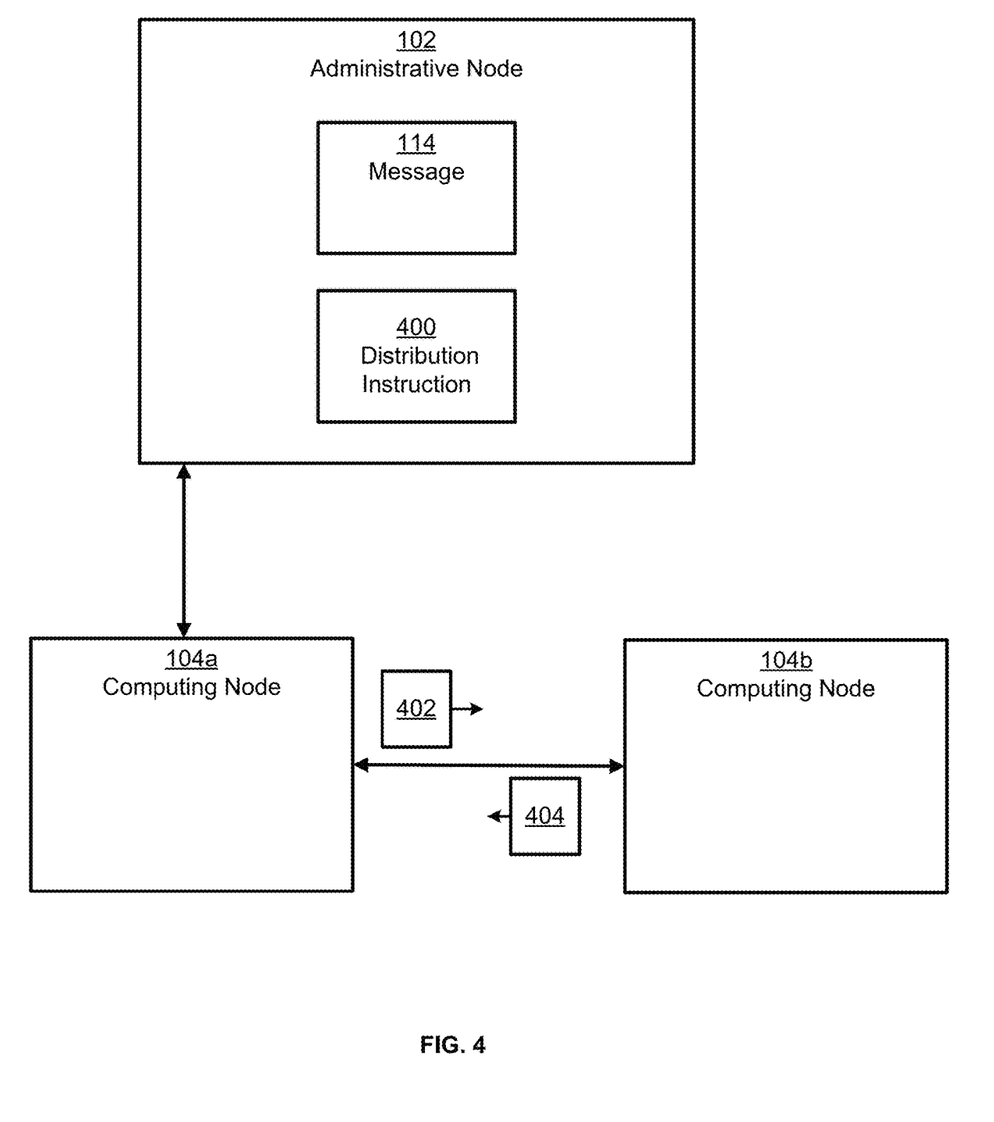
FIG. 4 is a block diagram of an example of nodes within a mesh implementing a distribution instruction according to some aspects of the present disclosure.

FIG. 4 is a block diagram of an example of nodes within a mesh implementing a distribution instruction according to some aspects of the present disclosure. The administrative node 102 contains the message 114 and a distribution instruction 400 for the message 114. The computing node 104*a* is in communication with the administrative node 102. Computing node 104*a* is also in communication with computing node 104*b*. In the present example, computing node 104*b* is out of communication range (e.g., wireless communication range) with the administrative node 102, so the administrative node 102 may be unable to directly communicate with the computing node 104*b*. But the administrative node 102 may be able to transmit messages to the computing node 104*b* via the other computing node 104*a*, as described below.

The administrative node 102 may transmit a message to computing node 104*a* along with the distribution instruction 400. The distribution instruction 400 may indicate how the message 114 is to be distributed within the mesh network. For example, the distribution instruction 400 may include a command for causing computing node 104a to transmit a notification 402 related the message to computing node 104b. Such a notification 402 may serve to notify computing node 104b that the message has been received by, and is available at, computing node 104a. Computing node 104b may respond to the notification 402 by remaining silent or by transmitting a request 404 for the message from computing node 104a.

If the computing node 104b transmits the request 404, computing node 104a may respond by forwarding the message 114 to computing node 104b. In some examples, computing node 104a may also send the distribution instructions 400 along with the message 114 to computing node 104b, thus enabling computing node 104b to issue the notification 402 and transmit the message 114 to other nodes within the mesh network 100.

One particular example may take place in a medical context in which a desktop computer acting as the administrative node 102 transmits the message 114 containing patient data and the distribution instruction 400 to a nurse's tablet acting as computing node 104a. The nurses tablet may then, when in broadcasting range of a printer within a patient's room (the printer acting as computing node 104b), transmit the notification 402 to the printer. In response to the notification 402, the printer can transmit the request 404 to the tablet. In response to receiving the request 404, the tablet can then broadcast the message 114 to the printer.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by a processing device for causing the processing device to:
   receive computing metrics, from computing nodes within a mesh network, indicating resource usage on the computing nodes;
   determine message sizes for the computing nodes based on the computing metrics;
   compare the message sizes to one another to determine a smallest message size among the message sizes;
   select the smallest message size for use as a maximum message size within the mesh network; and
   transmit the maximum message size to the computing nodes, the computing nodes being configured to receive the maximum message size and responsively configure themselves to comply with the maximum message size.

2. The non-transitory computer-readable medium of claim 1, further comprising program code that is executable by the processing device for causing the processing device to:
   receive a message from a transmitting node;
   determine whether a size of the message exceeds the maximum message size; and
   based on determining that the size of the message does not exceed the maximum message size, transmit the message to a computing node in the mesh network.

3. The non-transitory computer-readable medium of claim 2, wherein the message includes instructions or commands for the computing node.

4. The non-transitory computer-readable medium of claim 1, further comprising program code that is executable by the processing device for causing the processing device to:
   receive a message from a transmitting node;
   determine whether a size of the message exceeds the maximum message size; and
   based on determining that the size of the message exceeds the maximum message size, reject the message and notify the transmitting node that the size is too large.

5. The non-transitory computer-readable medium of claim 1, further comprising program code that is executable by the processing device for causing the processing device to:
   receive a message from a transmitting node, the message being intended for a particular computing node of the mesh network;
   determine whether a size of the message exceeds the maximum message size; and
   based on determining that the size of the message exceeds the maximum message size, transmit the message to a dead-letter queue that is external to the particular computing node.

6. The non-transitory computer-readable medium of claim 1, further comprising program code that is executable by the processing device for causing the processing device to:
   assign a first computing node of the computing nodes to a first message group based on a first message size corresponding to the first computing node, the first message size being one of the message sizes, and the first message group being configured to handle messages that are less than or equal to the maximum message size;
   assign a second computing node of the computing nodes to a second message group based on a second message size corresponding to the second computing node, the second message size being one of the message sizes, and the second message group being capable of handling messages that are greater than the maximum message size;
   receive a message destined for the first computing node;
   determine that a size of the message exceeds the maximum message size; and
   based on determining that the size of the message exceeds the maximum message size, forward the message to the second computing node rather than the first computing node.

7. The non-transitory computer-readable medium of claim 1, further comprising program code that is executable by the processing device for causing the processing device to:
   transmit a message to a computing node; and
   transmit a distribution instruction to the computing node, the computing node being configured to receive the distribution instruction and respond to the distribution instruction by performing operations including:
      transmitting a notification about the message to at least one other node in the mesh network;
      subsequent to transmitting the notification, receiving a request for the message from the at least one other node; and
      transmitting the message to the at least one other node in response to receiving the request.

8. A system comprising:
   a processing device; and
   a memory device including instructions executable by the processing device for causing the processing device to:
      receive computing metrics from a plurality of computing nodes within a mesh network, each computing node of the plurality of computing nodes providing a respective set of computing metrics indicating resource usage on the computing node;

determine a plurality of message sizes for the plurality of computing nodes, each message size of the plurality of message size being determined for a respective computing node of the plurality of computing nodes based on the respective set of computing metrics received from the respective computing node, wherein the plurality of message sizes are different from the computing metrics;

compare the plurality of message sizes to one another to determine a smallest message size among the plurality of message sizes;

select the smallest message size for use as a maximum message size within the mesh network; and based on selecting the smallest message size for use as the maximum message size within the mesh network, transmit the maximum message size to the plurality of computing nodes within the mesh network, the plurality of computing nodes being configured to receive the maximum message size and responsively configure themselves to generate messages that comply with the maximum message size.

9. The system of claim 8, wherein the memory device further includes instructions that are executable by the processing device for causing the processing device to:
receive a message from a transmitting node;
determine whether a size of the message exceeds the maximum message size; and
based on determining that the size of the message does not exceed the maximum message size, transmit the message to a computing node in the mesh network.

10. The system of claim 9, wherein the message includes instructions or commands for the computing node.

11. The system of claim 8, wherein the memory device further includes instructions that are executable by the processing device for causing the processing device to:
receive a message from a transmitting node;
determine whether a size of the message exceeds the maximum message size; and
based on determining that the size of the message exceeds the maximum message size, reject the message and notify the transmitting node that the size is too large.

12. The system of claim 8, wherein the memory device further includes instructions that are executable by the processing device for causing the processing device to:
receive a message from a transmitting node, the message being intended for a particular computing node of the mesh network;
determine whether a size of the message exceeds the maximum message size; and
based on determining that the size of the message exceeds the maximum message size, transmit the message to a dead-letter queue that is external to the particular computing node.

13. The system of claim 8, wherein the memory device further includes instructions that are executable by the processing device for causing the processing device to:
assign a first computing node of the plurality of computing nodes to a first message group based on a first message size corresponding to the first computing node, the first message size being one of the plurality of message sizes, and the first message group being configured to handle messages that are less than or equal to the maximum message size;
assign a second computing node of the plurality of computing nodes to a second message group based on a second message size corresponding to the second computing node, the second message size being one of the plurality of message sizes, and the second message group being capable of handling messages that are greater than the maximum message size;
receive a message destined for the first computing node;
determine that a size of the message exceeds the maximum message size; and
based on determining that the size of the message exceeds the maximum message size, forward the message to the second computing node rather than the first computing node.

14. The system of claim 8, wherein the memory device further includes instructions that are executable by the processing device for causing the processing device to:
transmit a message to a computing node; and
transmit a distribution instruction to the computing node, the computing node being configured to receive the distribution instruction and respond to the distribution instruction by performing operations including:
transmitting a notification about the message to at least one other node in the mesh network;
subsequent to transmitting the notification, receiving a request for the message from the at least one other node; and
transmitting the message to the at least one other node in response to receiving the request.

15. A method comprising:
receiving, by an administrative node, computing metrics from a plurality of computing nodes within a mesh network, each computing node of the plurality of computing nodes providing a respective set of computing metrics indicating resource usage on the computing node;
determining, by the administrative node, a plurality of message sizes for the plurality of computing nodes, each message size of the plurality of message size being determined for a respective computing node of the plurality of computing nodes based on the respective set of computing metrics received from the respective computing node;
comparing, by the administrative node, the plurality of message sizes to one another to determine a smallest message size among the plurality of message sizes;
selecting, by the administrative node, the smallest message size for use as a maximum message size within the mesh network; and
based on selecting the smallest message size for use as the maximum message size within the mesh network, transmitting, by the administrative node, the maximum message size to the plurality of computing nodes within the mesh network, the plurality of computing nodes being configured to receive the maximum message size and responsively configure themselves to generate messages that comply with the maximum message size.

16. The method of claim 15, further comprising:
receiving a message from a transmitting node;
determining whether a size of the message exceeds the maximum message size; and
based on determining that the size of the message does not exceed the maximum message size, transmitting the message to a computing node in the mesh network.

17. The method of claim 16, wherein the message includes instructions or commands for the computing node.

18. The method of claim 15, further comprising:
receiving a message from a transmitting node;
determining whether a size of the message exceeds the maximum message size; and
based on determining that the size of the message exceeds the maximum message size, rejecting the message and notify the transmitting node that the size is too large.

19. The method of claim 15, further comprising:
receiving a message from a transmitting node, the message being intended for a particular computing node of the mesh network;
determining whether a size of the message exceeds the maximum message size; and
based on determining that the size of the message exceeds the maximum message size, transmitting the message to a dead-letter queue that is external to the particular computing node.

20. The method of claim 15, further comprising:
assigning a first computing node of the plurality of computing nodes to a first message group based on a first message size corresponding to the first computing node, the first message size being one of the plurality of message sizes, and the first message group being configured to handle messages that are less than or equal to the maximum message size;
assigning a second computing node of the plurality of computing nodes to a second message group based on a second message size corresponding to the second computing node, the second message size being one of the plurality of message sizes, and the second message group being capable of handling messages that are greater than the maximum message size;
receiving a message destined for the first computing node;
determine that a size of the message exceeds the maximum message size; and
based on determining that the size of the message exceeds the maximum message size, forwarding the message to the second computing node rather than the first computing node.

* * * * *